R. WHITE.

Improvement in Revolving Fire-Arms.

No. 4,958. Reissued June 25, 187

*Witnesses:*

Henry N. Miller

C. L. Ewert.

*Inventor.*

Rollin White.

per Alexander Mason

*Attorneys.*

AM. PHOTO-LITHOGRAPHIC CO. N.Y. (OSBORNE'S PROCESS.)

UNITED STATES PATENT OFFICE.

ROLLIN WHITE, OF LOWELL, MASSACHUSETTS.

IMPROVEMENT IN REVOLVING FIRE-ARMS.

Specification forming part of Letters Patent No. 93,653, dated August 10, 1869; reissue No. 4,958, dated June 25, 1872.

*To all whom it may concern:*

Be it known that I, ROLLIN WHITE, of Lowell, in the county of Middlesex and State of Massachusetts, have invented certain new and useful Improvements in the Means for Discharging Metallic Cartridge-Cases from the Chambers of Repeating Fire-Arms; and I do hereby declare the following to be a full, clear, and exact description thereof, reference being had to the accompanying drawing and to the letters of reference marked thereon.

My invention is for the purpose of discharging the metallic cartridge-cases from the chambers in that class of repeating fire-arms which consists of a cylinder having a series of chambers bored entirely through, and which is rotated to bring the several chambers successively in line with a fixed barrel to be fired.

In order to enable others skilled in the art to which my invention appertains to make and use the same, I will now proceed to describe its construction and operation, referring to the annexed drawing, which forms a part of this specification, and in which—

Figure 1:
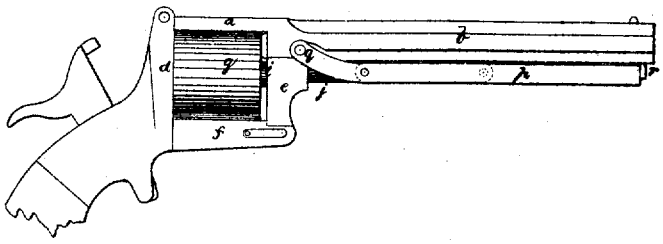
Figure 3:
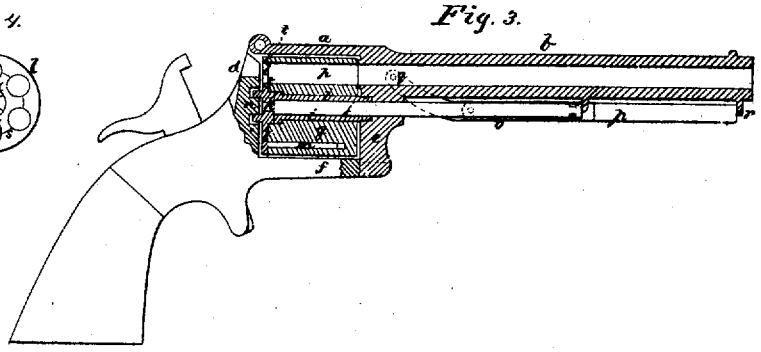
Figure 2:
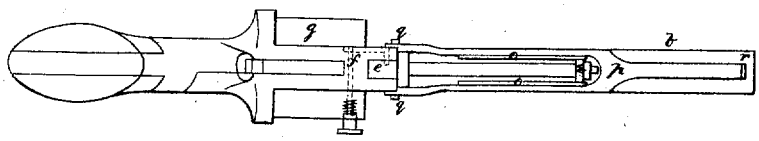

Figure 1 is a side elevation of a pistol on my improved plan. Fig. 2 is a view of the under side thereof. Fig. 3 is a longitudinal section in the plane of the axis of the barrel; and Fig. 4 is a cross-section taken at the line A *a* of Fig. 3.

A metal strap or projection, *a*, formed on or attached to the barrel *b*, is hinged to the recoil-shield *d* or a portion of the lock-frame, and another projection, *e*, from the rear part of the barrel fits into and is secured by a spring-latch in another portion of the lock-frame. The many-chambered cylinder *g* is mounted between a projection, *f*, of the lock-frame and the projection on the end of the barrel. The chambers *h* of the cylinder are bored entirely through, so that metallic-cased cartridges can be inserted from the rear end of the cylinder when the barrel is unlatched and turned on its hinge, and when the barrel is brought back to its place and latched the recoil-shield incloses the rear end of the cylinder and shuts in the cartridges. The central bore of the cylinder is fitted on a tube, *i*, which may be inserted from the rear end, and secured at its forward end to the projection *e* under the barrel. The rear portion of this tube may be of greater diameter than the forward portion, as shown, and in that case the central bore of the cylinder should be of corresponding form, so that when the tube is secured in place the cylinder cannot slide back. To the bore of this tube is fitted a central cylindrical spindle, *j*, which is free to slide therein longitudinally, and to the rear end of this spindle is properly secured the hub *k* of the plate or disk *l*, which plate, when brought in contact with the rear end of the cylinder, fits against the same, and between it and the recoil-shield; and to this plate or disk, and near the periphery thereof, is secured a cylindrical pin, *m*, parallel with the spindle, and fitted to slide in a small hole bored in the cylinder near the periphery, and between any two of the chambers. The object of the pin *m* is to cause the ejector-plate to rotate with the cylinder, and to so control and guide the ejector as to at all times cause the prongs of the ejector-plate to fit between the cartridge-orifices in the cylinder. By the use of this pin in small fire-arms it is not necessary to make a large orifice for the base-pin, spindle, or journal; hence the cylinder would not be weakened to any great extent. The rear end of the hub *k* of the plate or disk *l* is tubular, and when the barrel is locked in place this tubular projection turns in an annular recess in the recoil-shield, the projection *n* in the center of said annular recess on the recoil-shield fitting into the hollow of the tubular hub, and acting as a pivot to the rear end of the spindle, and also assisting in supporting the rear end of the cylinder. Ratchet-teeth are formed in the rear edge of the tubular hub to receive the action of the mechanism of the lock to turn the cylinder, in manner well known to those acquainted with this class of repeating fire-arms. The spindle *j* is connected by a swivel-joint with a reciprocating carrier, *w*, so that while the carrier will move the ejector-plate back and forth from the end of the cylinder, the swivel-joint will allow said ejector-plate to revolve with the cylinder. This swivel may be at either end of the spindle. A pair of links, *o o*, are hinged to a part of the carrier *w*, and at their other ends they are also hinged to the two forks of a lever, *p*, which turns on fulcrum-pins at *q* near the rear end of the barrel, by the movement of which the spindle *j*, with its plate or disk *l*, is pushed back, when the barrel is unlatched and moved from the breech to expose the rear end of the cylinder. When the plate or disk is drawn forward in contact with the cylinder the lever *p* lies under the barrel, and is there held by a spring-catch at *r*. The plate or disk *l* is bored through to correspond with the chambers in the end of the cylinder, and as the kind of metallic-cased cartridges intended to be used in arms of this kind have a flange or other lateral projection on their end when inserted in the chambers of the cylinder, such flange or other projection will bear against the outer face of the plate or disk *l*, so that when the said plate is pushed back all the cartridge-cases will be drawn out of and discharged from the cylinder. This disk or plate may be made of the same diameter as the cylinder, so as to entirely surround each cartridge, and as the force of the discharge tends to expand the cases, and this would tend to make the cartridge-cases bind in the holes in the plate or disk, or press against some part of the ejector, so that they would not readily drop out of or from the plate after being drawn out of the chambers. I effectually prevent such binding by forming the rear end of the cylinder with projecting flanges *t* around the rear ends of the chambers, and make the ejector-plate to fit outside of such flanges. The outer surface of these flanges I prefer to have beveled, and the holes in the plate or ejector made of a form to fit over such bevel. In this way the chambers receive and resist the expansion of the cartridge-cases, and the friction induced by such binding is readily overcome by the ejector. This part of my invention may be dispensed with, and still retain some of the advantages due to the other improvements.

Figure 4:
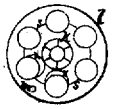

Instead of making the ejector-plate of the full diameter of the cylinder, a recess may be made in the rear end of the cylinder equal in depth to the thickness of the plate to receive the plate, which may be made of just sufficient diameter to extend under a portion of the flange of each of the cartridges, as represented by the lines *s* in Fig. 4, which show a portion of the plate so made; or it may be made in spider-form, as represented by the lines *x*, same figure, so as to bring, as it were, a fork under each cartridge-flange.

Although I have described my said invention as applied to a many-chambered cylinder in which the flanged cartridges are inserted at the rear end, I do not wish to be understood as limiting my claim of invention to such application, as it will be obvious that it is equally applicable to a cylinder having the chambers so formed that the flanged cartridges are inserted at the front end, the flanges of the cartridges being also at the front end.

Having thus fully described my invention, what I claim as new, and desire to secure by Letters Patent, is—

1. In a many-chambered revolving fire-arm, the combination of a cartridge-extractor, (to withdraw two or more cartridges at one time,) a revolving-cylinder, a breech, (or recoil-plate,) and a barrel hinged at its breech to the frame, so that it shall move around the hinge in the same plane with it, and, when opened, the inner face of the cylinder shall at the first movement be separated entirely from the recoil-plate, and the space between them be continually increased.

2. In combination with a revolving many-chambered cylinder, and a cartridge-ejector revolving therewith and moved by a reciprocating non-rotating carrier, *w*, a swivel-joint, to allow the ejector to turn independently of the carrier, substantially as described.

3. The cartridge-ejector and many-chambered cylinder, in combination with a lever to operate the ejector, substantially as described.

4. In combination with the many-chambered cylinder and cartridge-ejector, a projecting flange, *t*, around, or partially around, the end of each chamber, substantially as described, to prevent the cartridge-case from binding in the ejector, as set forth.

5. In combination with the revolving cylinder and ejector, the tube *i*, substantially as and for the purpose described.

6. The combination of a many-chambered cylinder, a multiple ejector, a base-pin, and the pin *m*, connected to the ejector and the cylinder, all substantially as set forth.

In testimony that I claim the foregoing I have hereunto set my hand this 22d day of April, 1872.

ROLLIN WHITE.

Witnesses:
C. L. EVERT,
A. N. MARR.